June 4, 1963  D. H. VIELE  3,092,317
COUNTING DEVICE

Filed Dec. 1, 1960  2 Sheets-Sheet 1

INVENTOR.
DONALD H. VIELE
BY
*Jerry J. Dunlap*
ATTORNEY

June 4, 1963 D. H. VIELE 3,092,317
COUNTING DEVICE
Filed Dec. 1, 1960 2 Sheets-Sheet 2

INVENTOR.
DONALD H. VIELE
BY
*Jerry J. Dunlap*
ATTORNEY 3,092,317
COUNTING DEVICE
Donald H. Viele, 755 John St., Camden, Ark.
Filed Dec. 1, 1960, Ser. No. 73,043
8 Claims. (Cl. 235—91)

This invention relates to devices for registering a count, and more particularly, but not by way of limitation, the present invention relates to a tree counting device which keeps a running total of the number of trees of various sizes, species, or grades which it is desired to count.

In the timber industry, it is frequently necessary to obtain a count of the number of trees of various types which are growing upon a given acreage. In some instances, it may be desirable to determine the number of hardwoods and the number of softwood types growing in a given area. In other instances, it may be desirable to determine the number of trees which are of a certain size upon a given area of land. In any of these situations, it is necessary to count all of the trees in the several categories, continuously maintaining during such count a running total of the trees in each category. In most cases, it is absolutely essential that the total counts which are arrived at be absolutely correct since an error of one tree may mean an economic loss of $50.00 or more.

The difficulties which characterize such counting operations and which considerably reduce the likelihood of an accurate count being rendered are greater and more numerous than might be supposed by one unschooled in the operations of the timber industry. It will, of course, be apparent that if a number of trees in a plurality of categories are to be counted, mere reliance upon the mathematical ability and memory of the average operator is an unsatisfactory method of obtaining such information.

In order to avoid the necessity of reliance on memory, or the use of the relatively slow technique of utilizing pencil and paper, mechanical devices have previously been devised for maintaining a running total of the trees observed by the operator. Most of these devices, however, have been characterized by one or more disadvantages which render them less useful under some circumstances of operation, or else which render the counts derived therefrom unreliable. Thus, in some instances the devices have merely functioned to record a series of marks corresponding in number to the number of trees counted and the operator must total the marks following the counting operation to arrive at a total count. In other previous devices, the working parts of the devices have not been adequately protected, and the devices soon become defective or inoperative due to contact with heavy underbrush or due to their utilization during rain, fog or inclement weather.

Another disadvantage which has characterized many tree counting devices of the prior art has been the failure to provide mechanism which assures that the operator cannot erroneously operate the device, thus deriving an inaccurate count therefrom. Among the devices which share the latter disadvantage, those which employ a threaded rod having a pointer which moves along the rod and points to a numerical scale as the rod is rotated are prominent. Too frequently devices of this type have not provided any type of control means to assure that the operator does not inadvertently reverse the direction of rotation of the rod, thus subtracting from the total count previously registered by the device. Neither have such devices prevented the operator from rotating the rod more than one revolution for each count, thus producing a greater total count than in fact should be indicated. Yet another disadvantage of many previous types of tree counting devices has been their relatively large size and weight which, of course, make them difficult to transport over rough terrain and through heavy underbrush. Moreover, the size and shape of many such devices have been such that one or both hands of the operator must be employed to carry and manipulate the device. If it is necessary for the operator to perform some other manual operation during the time he is upon the tract where the count is being made, it is necessary for him to temporarily place the counting device upon the ground, thus permitting it to become wet or contaminated with humus, bark and dirt.

The present invention contemplates a novel tree counting device which is compact, very light, and which is adapted to be worn on the waist belt of the operator, thus freeing both hands for use in other work. The counting device is provided with a number of threaded rods extending through a hollow housing and each carrying a moving pointer-indicator which indicates upon a scale the total count of a specific category of tree, one category corresponding to each of the rods. The working parts of the counting device are substantially completely enclosed so that they are protected from interference by underbrush and from corrosion and malfunctioning resulting from exposure to inclement weather. A novel mechanism is provided for assuring that the pointer-indicators cannot be moved in the reverse direction, thus subtracting from the correct total count, and said mechanism also assures that the operator will be apprised through his senses of hearing and touch of the registration of each single count which is recorded by the counting device. Upon the completion of a tree counting operation, the mechanism of the device permits the pointer-indicator to be quickly and easily reset at the zero position preparatory to commencing the next counting operation.

It is accordingly a major object of the present invention to provide a tree counting device which is compact in size, light in weight and is adapted to be worn upon the waist belt of an operator.

A further object of the present invention is to provide a tree counting device which may be utilized to register the total number of trees in each of several categories of trees which are located upon a given tract of land.

Another object of the present invention is to provide a tree counting device which produces signals when each count is registered, which signals are discernible by the operator of the device through his auditory and tactile senses.

Another object of the present invention is to provide a counting device in which the moving parts are housed for protection against inclement weather and dense underbrush.

A further object of the present invention is to provide a tree counting device which assures the maximum accuracy in obtaining a total count of the various types of trees located upon a particular tract of land.

Yet another object of the present invention is to provide a counting device which operates equally well in any position and is not deactivated by gravity in any position.

Another object of the present invention is to provide a counting device with a novel locking mechanism which assures that the operator of the device may not inadvertently manipulate the device to cause an erroneous count to be registered thereby.

Another object of the present invention is to provide a counting device which permits the device to be easily and rapidly re-zeroed following each counting operation in preparation for a new counting operation.

These objects and advantages of the present invention will be better understood, and other objects and advantages will become apparent, upon a reading of the following disclosure in conjunction with a consideration of the accompanying drawings which illustrate my invention.

Figure 1:
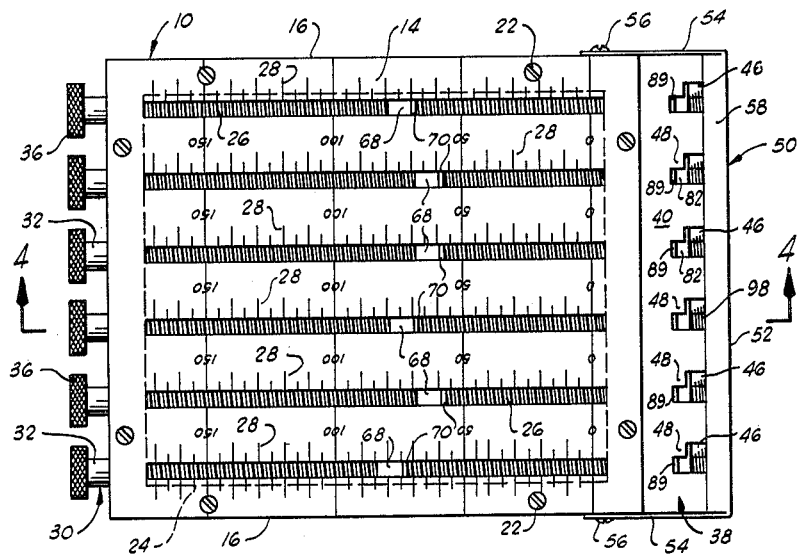
FIGURE 1 is a plan view of the counting device of the present invention, showing the device in assembled relation as it is viewed from the front of the device.
Figure 2:
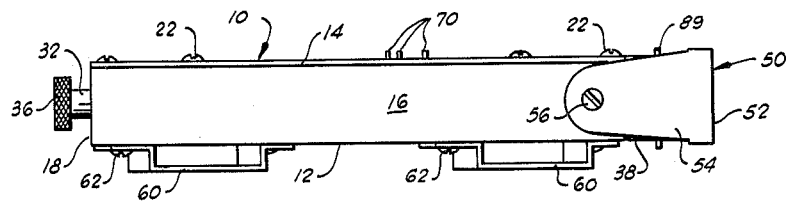
FIGURE 2 is a side view in elevation of the device.

Referring now to the drawings in detail, and particularly to FIG. 1, the counting device of the present invention is characterized by a housing which is generally designated by reference character 10 and comprises a back side 12 (see FIGS. 2 and 3), a front side 14, interconnecting sides 16, and two end sides 18 and 20. The end side 20 is obscured by other parts of the device in FIGS. 1, 2 and 3, but may be seen in the sectional view illustrated in FIG. 4 and the exploded view illustrated in FIG. 5.

The front side 14 of the counting device may be formed integrally with the remaining sides of housing 10, but I prefer to form the front side 14 as a detachable cover plate which is secured to the sides 16, 18 and 20 by means of screws 22. To facilitate the attachment of the front side 14, which I will hereinafter refer to as the cover plate, to the sides 16, 18 and 20, each of the latter sides has formed integrally therewith a right angular flange 24 which provides a seat or rim to which the cover plate 14 may be secured (see FIG. 4).

As shown in FIG. 1, the cover plate 14 is provided with a plurality of parallel, elongated slots 26 which each extend from a point closely adjacent one edge of the cover plate 14 to a point closely adjacent its opposite edge. Along the side of each of the slots 26, a numerical scale 28 is provided. The scales 28 each commence with a zero reading adjacent one end of the respective adjacent slot and terminate with a number which is of sufficient magnitude to permit a large total number of trees to be registered upon the scale during the tree counting operation. The scales 28 are preferably divided into divisions representing a single unit, but in some instances it may be necessary or desirable to use larger scale divisions—for example, divisions representing five of the units to be counted.

Figure 4:
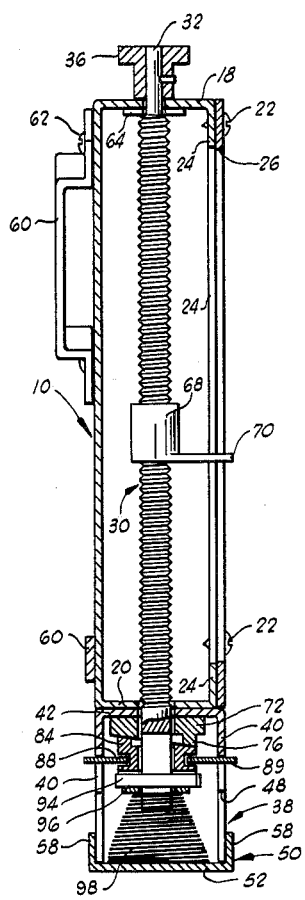
FIGURE 4 is a sectional view taken along lines 4—4 of FIG. 1.

A plurality of shafts 30 which are threaded over the major portion of their length extend through the end sides 18 and 20 of the housing 10 and are rotatably journaled therein. In referring to FIG. 1, it will be perceived that the threaded portion of each shaft 30 is located inside the housing 10 and extends parallel to and beneath one of the slots 26. The two ends 32 and 34 of each of the shafts 30 are smooth (not threaded) and project beyond the end sides 18 and 20 of the housing 10. As illustrated in FIG. 4, the end 32 of each of the shafts 30 is of smaller diameter than the remainder of the shaft and a knurled knob 36 is keyed thereto to facilitate the rotation of the shaft by the use of the fingers. A washer 64 coaxially surrounds the end portion 32 of the shaft 30 between the end side 18 of the housing 10 and the threaded portion of the shaft 30.

Figure 5:
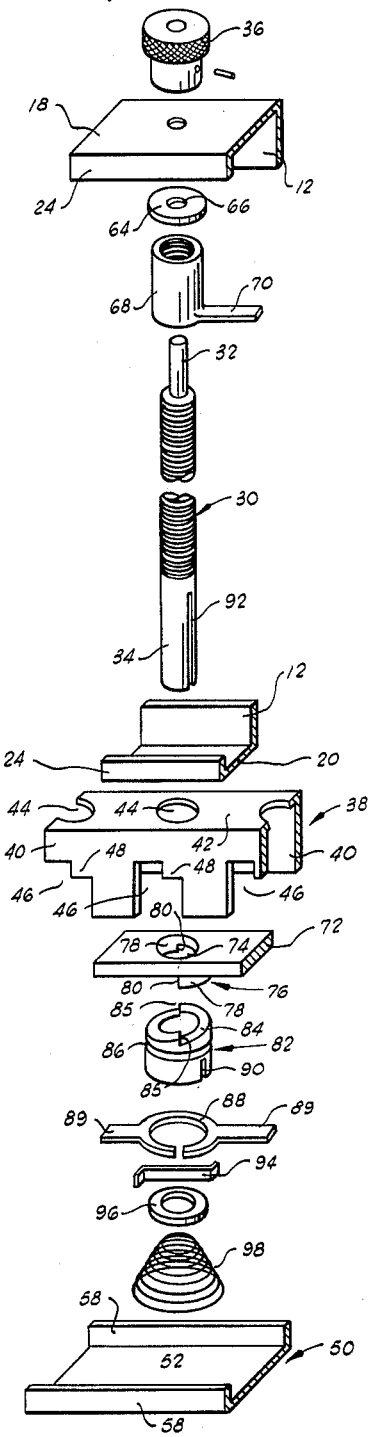
FIGURE 5 is an exploded view illustrating the manner in which one of the threaded shafts of the device is related to the other parts and elements of the device.

A generally U-shaped member 38 is secured to the end side 20 of the housing 10 and comprises a pair of parallel legs 40 which extend outwardly from the housing 10, and an interconnecting web 42 which is backed flatly against the end side 20 of the housing 10. The web 42 of the U-shaped member 38 is characterized by a plurality of spaced apertures 44 (see FIG. 5) formed therein to permit the threaded shafts 30 to pass therethrough. Each leg 40 of the U-shaped member 38 is provided with a plurality of spaced slots 46 of generally L-shaped configuration which originate at the free edges of the legs 40 and terminate between the free edges and the web portion 42. It will be noted that each of the L-shaped slots 46 is defined in part by a shoulder 48 in its respective leg 40. The function of the shoulder 48 will be described in greater detail in conjuction with the description of the operation of the three counting device set forth hereinafter. As shown in FIG. 5, each of the slots 46 is aligned with one of the apertures 44 so that each of the L-shaped slots is located directly above or below the end 34 of one of the threaded shafts 30.

A bracket designated generally by reference character 50 is secured to the same end of the housing 10 as that to which the U-shaped member 38 is attached and comprises a base plate 52 and a pair of arms 54, which arms are secured to the sides 16 of the housing 10 by means of screws 56. The base plate 52 is provided with a pair of flanges 58 which extend normal to the opposite edges thereof so that when the bracket 50 is secured to the housing 10, the open end of the U-shaped member 38 is closed by the base plate 52 and its associated flanges 58 (see FIGS. 1, 2 and 4).

Figure 3:
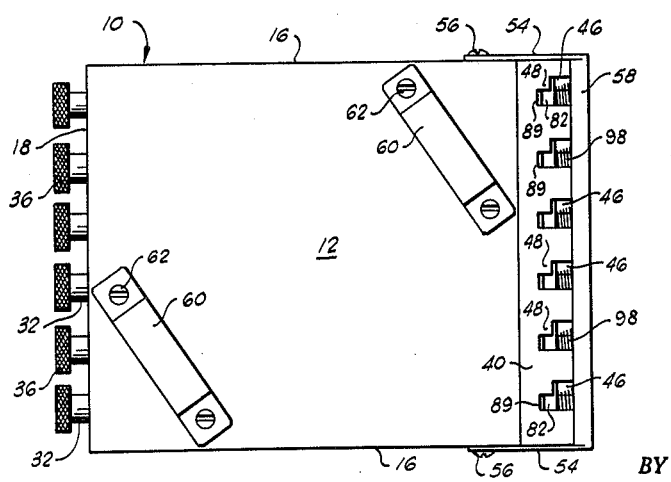
FIGURE 3 is a plan view of the device as it appears when viewed from the back.

Referring now to FIG. 3 of the drawings, it will be perceived that the back side 12 of the counting device is provided with a pair of brackets 60 which are located at diagonally opposite corners of the back plate 12 and are secured to the back plate by screws 62 or other suitable means. The brackets 60 are aligned along the diagonal of the back plate 12 in a manner to permit the three counting device to be carried upon the waist belt of an operator so that the knurled knobs 36 may be manipulated by the fingers of the operator.

The manner in which each of the threaded shafts 30 is mounted in the housing 10 for cooperation with the various elements of the counting device is best illustrated in FIGS. 4 and 5. As has been previously explained, the end 32 of each threaded shaft 30 is of reduced diameter and is characterized by a knurled knob 36 which is secured to the end 32 outside the housing 10. An annular washer 64 having a central aperture 66 therein of a diameter which is slightly larger than the diameter of the end portion 32 of the shaft 30 coaxially surrounds the shaft 30 adjacent the internal wall of the end side 18 of the housing 10. The relative sizes of the end portion 32, of the shaft 30, of the knurled knob 36, and of the washer 64 are such that the threaded shaft 30 is retained in fixed position relative to the housing 10, and the washer 64 acts as a bearing between the threaded portion of the shaft 30 and the end side 18 of the housing 10.

Each of the threaded shafts 30 carries an internally threaded sleeve 68 of relatively short length which is threaded upon the shaft in the manner illustrated in FIG. 4 for axial movement therealong. Each of the sleeves 68 carries a projection 70 which projects upwardly through the slot 26 which overlies and extends parallel to its respective shaft 30. The projection 70 thus constitutes a pointer-indicator adapted for longitudinal movement along the scales 28 on the cover plate 14. As will be further explained below, the pointer-indicator 70 in projecting through the slot 26 prevents the rotation of the sleeve 68 so that the sleeve must move axially on its threaded shaft 30 when the shaft is rotated.

The ends 34 of the shafts 30 pass through the apertures formed in the end side 20 of the housing 10 and through the apertures 44 in the U-shaped member 38. A flat cam plate 72 which is characterized by a plurality of circular openings 74 is secured in flatly abutting relation to the web portion 42 of the U-shaped member 38 with the openings 74 in registry with the apertures 44 in the web portion 42. A cam follower, designated generally by reference character 76, is disposed around each of the openings 74 on the side of the cam plate 72 opposite its side which abuts the U-shaped member 38. Each of the cam followers 76 includes at least one inclined portion 78 which originates in the major plane of the cam plate 72 and inclines gradually away therefrom. The inclined portion 78 is, of course, arcuate in shape, conforming substantially to the peripheral contour of its respective opening 74. At some point around the periphery of the opening 74, the inclined portion 78 terminates abruptly to form a shoulder 80 which extends normal to the major plane of the cam plate 72. In the preferred embodiment shown in FIGS. 4 and 5, each of the cam followers 76 is comprised of two inclined portions 78, each of which terminates abruptly in a shoulder 80.

After passing through the apertures in the end side 20 of the housing 10, and also through the registering apertures 44 and 74, the end portions 34 of the threaded shafts 30 pass through annular cam members, designated generally by reference character 82. Each annular cam member 82 is provided with a cammed surface which includes inclined portions 84 corresponding in their degree of incline and circumferential extent to the inclined portions 78 of the cam follower 76. Stated differently, the cammed surface of the cam member 82 is complementary in configuration to the cam follower 76 and mates therewith during the operation of the device in a manner more fully explained hereinafter. It will thus be apparent that, like the inclined portions 78, the inclined portions 84 of the cam member 82 are provided with shoulders, these being designated by reference character 85.

A circumferential groove 86 is provided in a medial portion of the annular cam member 82 for rotatively receiving an annular split washer 88 therein. The split washer 88 is characterized by an inside diameter which is smaller than the outside diameter of the annular cam member 82 so that the washer 88 is prevented from moving axially with respect to the cam member 82 when it is installed in the circumferential groove 86. A pair of projections 89 are formed integrally with the washer 88 and extend outwardly from each side thereof for a purpose to be subsequently explained. At the end of the annular cam member 82 opposite its cammed surface, the cam member 82 is characterized by a transverse keyway 90 which permits the annular cam member 82 to be keyed to its respective threaded shaft 30 for rotation therewith. In referring to FIG. 5, it will be observed that the end portion 34 of each threaded shaft 30 has formed therein an axially extending, diametrical slot 92. When the counting device is assembled, the slot 92 in the threaded shaft 30 is placed in registry with the keyway 90 in the cam member 82. A key member 94 is then pressed into the registering slots 90 and 92 to secure the cam member 82 to the threaded shaft 30 for rotation therewith while permitting the cam member to be moved axially with respect to the shaft.

To facilitate the retention of the key 94 in the keyway 90 and slot 92, and also to bias the cam member 82 into mating contact with the cam follower 76, an annular washer 96 is placed concentrically around the end portion 34 of each shaft 30 and bears against the cam member 82 and key 94. A compression spring 98 is then inserted between the base plate 52 of the bracket 50 and the washer 96. As is shown in FIG. 5, the compression spring 98 is pyramidal in shape so that a spring base of large diameter is provided for supporting the spring upon the base plate 52 while the apex of the spring is sufficiently small to maintain contact with the annular washer 96.

In referring to FIGS. 1, 4 and 5, it will be observed that the projections 89 which extend from the split washer 88 extend through the L-shaped slots 46 in the legs 40 of the U-shaped member 38 when the counting device is in assembled relation as shown in FIGS. 1 and 4. Thus, when the device is assembled, the compression spring 98 urges the inclined portions 84 of the cam member 82 into mating engagement with the inclined portions 78 of the cam follower 76, and the projections 89 of the split washer 88 are biased forward into the innermost portion of the L-shaped slots 46. The function of these elements of the device will be more fully explained in the description of its operation which now follows.

*Operation*

At the outset of the operational description of the present invention, it should be stated that the principles of the device, as utilized in the illustrated preferred embodiment, may be utilized in analogous devices which are capable of registering counts of much higher magnitude and of providing for a greater number of categories of objects to be counted than are provided for in the illustrated embodiment. Thus, while the tree counting device which is illustrated and described in the present application is designed to permit six categories of trees to be counted by virtue of the six threaded shafts which are provided, it will be apparent that additional shafts may be provided in situations where it is anticipated that a greater number of categories will be encountered.

To commence a tree counting operation utilizing the device of the present invention, the counter or tally man, who will be referred to hereinafter as the operator, attaches the device to his person by threading his belt through the brackets 60 provided at the back side 12 of the device. The arrangement of the brackets 60 is such that when the tree counting device is positioned on the operator's belt, the knurled knobs 36 will project upwardly at approximately a 45-degree angle to the vertical plane extending through the operator's body normal to the belt. When the device is thus positioned, the knurled knobs 36 are located in the position which makes them most easily accessible for digital manipulation by the operator.

Assume now for purposes of discussion that the tree counting device has been "zeroed" by locating the threaded sleeves 68 adjacent the end side 20 of the housing 10 so that the pointer-indicators 70 are even with the zero reading on their respective adjacent scales 28. As the operator enters the tract of land upon which the trees are to be counted, he is pre-instructed as to the categories of trees of which he is to obtain an accurate count. Each of the threaded shafts 30 and its knurled knob 36 corresponds to a separate category of trees which is to be counted and thus the operator will be enabled to count as many as six categories with the preferred embodiment of the device illustrated herein. When the operator commences his count, he will rotate one of the threaded shafts 30 each time he sees a tree which is to be counted. If he is obtaining a count of oak trees, pine trees, and cedar trees, for example, he will rotate a different one of the knurled knobs 36 for each tree of these different types which he perceives. As one of the knurled knobs 36 is rotated by the operator, the shaft 30 to which it is keyed will also be rotated and the pointer-indicator 70 will be caused to move axially along its respective shaft. The configuration of the inclined portions 78 and 84 of the cam follower 76 and the annular cam member 82, respectively, will permit the shaft 30 to be rotated in one direction only, while preventing any rotation in the reverse direction. Therefore, as the operator commences his count he can rotate the threaded shafts 30 in a direction which will advance the pointer-indicators 70 along the graduated scales 28 from the zero readings to higher readings, but he cannot rotate the threaded shafts 30 in the reverse direction so as to move the pointer-indicators from the higher ends of the scales 28 toward the zero positions.

As the operator continues to rotate the threaded shafts 30 by means of the knurled knobs 36, the resistance to such rotation is gradually increased as the inclined portions 84 of the annular cam members 82 are rotated with respect to the inclined portions 78 of the cam followers 76. The rate of increase of the resistance to rotation is such that the operator is able to discern quite easily the increased resistance to the rotation of the knurled knobs 36. This resistance to rotation of the threaded shafts 30 continues to increase until the shoulder portions 85 and 80 of the inclined portions 84 and 78, respectively, pass each other. At this time, the annular cam member 82 is suddenly forced upwardly by the spring 98 into precisely mating relation to the cam follower 76 and the resistance to the rotation of the threaded shaft 30 is suddenly decreased. Also, as the shoulders 80 and 85 of the cam follower 76 and cam member 82, respectively, slip past each other, and the cam follower 76 and cam member 82 become interlocked in mating relation, a loud clicking sound is made by the impact of the inclined portion 84 upon the inclined portion 78. It will thus be apparent that as the operator is rotating the threaded shaft 30 by means of the knurled knob 36, he is constantly apprised of the amount by which he has rotated the shaft by the audible and tactile signals generated by the cam follower 76 and the cam member 82. In the preferred embodiment illustrated in FIG. 5, a pair of semi-circular inclined portions 84 and 78 have been provided on both the cam follower 76 and annular cam member 82 so that a tactile and an audible signal are produced during each one-half revolution of the threaded shaft 30. With this arrangement, the scale 28 is graduated so that an additional unit is registered upon each of the scales as its respective pointer-indicator is moved an amount corresponding to one-half revolution of its respective threaded shaft 30.

To summarize the discussion of the operation of the device to this point, as the operator of the device observes a tree in one of the several categories to be counted, he turns the appropriate knurled knob 36 until he feels a sudden lessening of the resistance to the rotation of the knob and hears a loud click caused by the meshing of the inclined surfaces 78 and 84 of the cam follower 76 and cam member 82, respectively. At this point he ceases to turn the knurled knob 36, realizing that the count has been registered by the device, and that further turning is unnecessary. At all times, the operator is prevented, by the interlocking arrangement of the cam follower 76 and cam member 82, from inadvertently turning the knobs 36 in the reverse direction so as to subtract from the total registered count.

When the count has been completed, the pointer-indicators 70 corresponding to the various threaded shafts 30 will be located at various intermediate positions between the ends of the elongated slots 26, and will indicate upon the several scales 28 the total number of trees which have been counted in each of the several categories represented by each of the scales. The operator can then transfer the total count or tally from the count registered upon the scales of the device to appropriate permanent records, and the device may then be reset at the zero readings of the scales to permit a new count to be made in a different area. In order to reset each of the pointer-indicators 70 and its associated sleeve 68 at the origin of the scale 28, the operator depresses the projections 89 carried by the split washer 88 toward the bracket 50 against the resistance of the compression spring 98. This movement of the projections 89 toward the base plate 52 of the bracket 50 will force the cam member 82 to also move toward the end of its respective shaft 30 and out of engagement with the cam follower 76. When the cam member 82 has been completely disengaged from the cam follower 76, the projections 89 are twisted or turned laterally with respect to the counting device to engage the shoulder portions 48 of the legs 40 of the U-shaped member 38. The operator may then release the projections 89 and they will be retained in their retracted positions by the shoulder portions 48. In this position, the inclined portions 84 and 78 of the cam member 82 and cam follower 76, respectively, are disengaged so that the threaded shaft 30 may be rotated in either direction. The operator may then turn the knurled knob 36 in the proper direction to cause the threaded sleeve 68 and its associated pointer-indicator 70 to move toward the end side 20 of the housing 10. After the pointer-indicator has been positioned adjacent the zero reading of its respective scale, the projections 89 of the split washer 88 are again turned laterally to move the projections off the shoulders 48 of the U-shaped member 38. The compression spring 98 will then urge the cam member 82 toward the cam plate 72 until the cam member engages the cam follower. The device is now reset at the zero reading and is ready for the commencement of a new count.

From the foregoing, it will be apparent that the counting device of the present invention is characterized by novel mechanical structure which facilitates the obtainment of an accurate total count of objects in several categories. The device is believed to be unique in the provision of relatively simple and inexpensive mechanical elements which provide both audible and tactile signals which constantly apprise the operator of the registration of the count. The configuration and arrangement of the novel cam follower and cam means of the device is also considered an important feature of the present invention in that inadvertent reversal of the threaded shafts is prevented, thus assuring that an inaccurate total count will not result.

Changes may be made in the combination and arrangement of parts or elements as heretofore set forth in the specification and shown in the drawings, it being understood that changes may be made in the precise embodiment disclosed without departing from the spirit and scope of the invention as defined in the following claims.

I claim:

1. A device for registering a count comprising a hollow housing having an elongated slot in one side thereof, said one side having a numerical scale marked off along said slot; a threaded shaft extending beneath and parallel to said slot and passing through opposing sides of said housing and rotatably journaled therein; an internally threaded sleeve threaded on said shaft between said opposing sides; a pointer-indicator secured to said sleeve and extending through said slot; a cam follower mounted on said housing; and cam means keyed to said shaft for rotation therewith, said cam means and cam follower having interlocking faces for restricting the rotation of said shaft to one direction only and means for retaining said cam means and cam follower disengaged from each other to permit rotation of said shaft in both directions.

2. A device for registering a count as claimed in claim 1 wherein said interlocking faces are characterized by abrupt changes in contour whereby a sound signal is produced when said cam means is rotated with respect to said cam follower.

3. A device for registering a count as claimed in claim 1 wherein said cam means includes means providing a gradually increasing resistance to the rotation of said shaft during an interval of each complete rotation of the shaft, and providing a sudden decrease in resistance to the rotation of said shaft following the interval of gradually increasing resistance whereby the completion of the increment of one rotation of said shaft represented by said interval is indicated by the sudden decrease in resistance to the rotation of said shaft.

4. A device for registering a count as claimed in claim 1 wherein said cam means comprises an annulus coaxially keyed to said shaft; and resilient means urging said annulus into contact with said cam follower.

5. A device for registering a count as claimed in claim 1 wherein said one side is characterized by a plurality of parallel elongated slots with a numerical scale along each of said slots; and further characterized to include a plurality of threaded shafts each extending beneath and parallel to one of said slots and passing through opposing sides of said housing and rotatably journaled therein; a plurality of internally threaded sleeves threaded on each of said shafts between said opposing sides; a pointer-indicator secured to each of said sleeves and extending through the adjacent slot; a plurality of cam followers mounted on said housing; cam means secured to each of said shafts for rotation therewith, said cam means and cam followers having interlocking faces for restricting the rotation of said shafts to one direction only; and U-shaped brackets on the back of said housing for threading a supporting member therethrough.

6. In a counting device of the type having a rotatably mounted, threaded shaft, and a pointer-indicator cooperating with the threads of said shaft and moving axially along said shaft when said shaft is rotated, the improvement which comprises means for locking said shaft against inadvertent rotation in a reverse direction and for producing audible and tactile signals discernible by an operator of said device, means for quickly disengaging said locking means to permit said shaft to be reversed in rotation prior to commencing a new count, and a shoulder coacting with said disengaging means for automatically and positively retaining said locking means disengaged until such coaction is intentionally terminated by the operator of the counting device whereby said pointer-indicator may be re-zeroed by an operator using a single hand.

7. A tree counting device comprising a rectangular housing having four sides and a bottom; a rectangular cover plate secured to the sides of said housing and extending parallel to the bottom thereof, said cover plate having a plurality of elongated parallel slots therein, and having graduated numerical scales thereon adjacent and parallel to each of said slots; a plurality of threaded shafts extending parallel to said slots through opposite sides of said housing and rotatably journalled therein, said shafts each having first and second ends protruding from said housing; an internally threaded sleeve threaded on each of said shafts between said opposing sides; a pointer-indicator secured to each of said sleeves and each extending through one of said slots whereby said indicator is advanced along the scale adjacent said one slot when its respective shaft is rotated; knurled knobs secured to one end of each of said shafts outside said housing to facilitate the rotation of said shafts; a plate secured to the outer surface of the side of said housing adjacent the second end of each of said shafts, said plate having openings therein to permit said shafts to pass therethrough; annular cam followers on said plate around each of said openings, said cam followers each comprising at least one inclined projection with the incline of said projection originating in the major plane of said plate, inclining gradually toward the second ends of said shafts, and terminating abruptly to form a shoulder extending axially with respect to said shafts; an annulus coaxially secured to each of said shafts for rotation therewith, and axially slidable therealong between said plate and the second ends of said shafts, said annuli each having a cam surface complementary in configuration to said annular cam followers and mating with said cam followers during rotation of said shafts; a bracket secured to said housing and having a plate extending normal to said shafts beyond the second ends thereof; and a compression spring disposed coaxially around each of said shafts between its respective annulus and said bracket plate whereby said annuli are constantly urged into mating contact with the annular cam followers; and disengaging means cooperating with said springs and said annuli to permit said annuli to be disengaged from said cam followers when desired whereby said shafts may be rotated in both directions and said pointer-indicators may be relocated at the origin of said scales when it is desired to begin a new count.

8. A counting device as claimed in claim 7 wherein said disengaging means comprises a projecting lip secured to each of said annuli; and means secured to said housing for engaging and retaining said lips when said annuli are moved toward the second ends of their respective shafts against the force exerted by said compression springs.

References Cited in the file of this patent

UNITED STATES PATENTS

| 1,417,011 | Albright | May 23, 1922 |
| 1,685,481 | Hart | Sept. 25, 1928 |
| 2,550,950 | Young | May 1, 1951 |
| 2,736,346 | Ammann | Feb. 28, 1956 |
| 2,759,666 | Wyckoff | Aug. 21, 1956 |
| 2,797,871 | Murphy | July 2, 1957 |
| 2,920,819 | Greenhow | Jan. 12, 1960 |

FOREIGN PATENTS

| 2,179 | Great Britain | Jan. 29, 1907 |
| 496,795 | Italy | Aug. 10, 1954 |